United States Patent
Totani et al.

(10) Patent No.: US 8,596,432 B2
(45) Date of Patent: Dec. 3, 2013

(54) SHOCK ABSORBING APPARATUS

(75) Inventors: Chiharu Totani, Aichi-ken (JP); Muneo Furutani, Aichi-ken (JP); Kiyoshi Suenaga, Aichi-ken (JP); Takehiko Shiraki, Aichi-ken (JP); Shigeru Yabuya, Aichi-ken (JP); Katsuhiro Katagiri, Aichi-ken (JP); Katsushi Ito, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 491 days.

(21) Appl. No.: 12/735,508

(22) PCT Filed: Jan. 27, 2009

(86) PCT No.: PCT/JP2009/051270
§ 371 (c)(1),
(2), (4) Date: Jul. 22, 2010

(87) PCT Pub. No.: WO2009/098971
PCT Pub. Date: Aug. 13, 2009

(65) Prior Publication Data
US 2010/0300824 A1     Dec. 2, 2010

(30) Foreign Application Priority Data

Feb. 4, 2008  (JP) .................................. 2008-023932
Feb. 18, 2008  (JP) .................................. 2008-036303

(51) Int. Cl.
*F16F 7/12*  (2006.01)

(52) U.S. Cl.
USPC .......................................... 188/376; 188/377

(58) Field of Classification Search
USPC ........... 188/371, 376, 377; 180/274; 280/751; 293/110, 107, 133, 134; 296/187.03, 296/187.05, 187.04
See application file for complete search history.

(56) References Cited

U.S. PATENT DOCUMENTS

| 4,029,350 | A | * | 6/1977 | Goupy et al. .................. 293/110 |
| 5,026,111 | A | * | 6/1991 | Hewko ......................... 296/146.6 |
| 5,098,124 | A | * | 3/1992 | Breed et al. .................... 280/751 |
| 5,141,279 | A | * | 8/1992 | Weller ......................... 296/146.7 |
| 5,303,843 | A | * | 4/1994 | Zink et al. ..................... 220/563 |
| 5,356,177 | A | * | 10/1994 | Weller .......................... 280/751 |

(Continued)

FOREIGN PATENT DOCUMENTS

| DE | 3925821 A1 * | 8/1990 |
| JP | 09-254727 A |   9/1997 |

(Continued)

OTHER PUBLICATIONS

Machine Translation of DE 3925821.*

(Continued)

*Primary Examiner* — Bradley King
*Assistant Examiner* — Nicholas J Lane
(74) *Attorney, Agent, or Firm* — Posz Law Group, PLC

(57) ABSTRACT

While comprising filled minor compartments being filled with an inclusion in which a liquid makes the major component, and vacant minor compartments being filled with the air, at least one of the vacant minor compartments adjoins the filled minor compartments, and a fragile section is formed in at least one of ribs that demarcate the filled minor compartments and the adjoining vacant minor compartments. After the fragile section has fractured, shock energy can be absorbed furthermore by means of circulation resistance to the inclusion that flows from the filled minor compartments to the vacant minor compartments.

14 Claims, 14 Drawing Sheets

(56) References Cited

U.S. PATENT DOCUMENTS

| | | | |
|---|---|---|---|
| 5,564,535 A * | 10/1996 | Kanianthra | 188/371 |
| 5,857,734 A * | 1/1999 | Okamura et al. | 296/187.12 |
| 6,234,526 B1 * | 5/2001 | Song et al. | 280/751 |
| 6,279,973 B1 * | 8/2001 | Albertini et al. | 293/107 |
| 6,959,894 B2 * | 11/2005 | Hayashi | 244/17.11 |
| 7,056,564 B2 * | 6/2006 | Sereboff | 428/36.5 |
| 7,350,851 B2 * | 4/2008 | Barvosa-Carter et al. | 296/187.02 |
| 2006/0165969 A1 | 7/2006 | Yamazaki | |
| 2011/0024250 A1 * | 2/2011 | Kitashiba et al. | 188/376 |

FOREIGN PATENT DOCUMENTS

| | | | |
|---|---|---|---|
| JP | 11-139341 A | 5/1999 | |
| JP | 11286822 A * | 10/1999 | |
| JP | 2000-272447 A | 10/2000 | |
| JP | 2001-132787 A | 5/2001 | |
| JP | 2004-360790 A | 12/2004 | |
| JP | 2005-022514 A | 1/2005 | |
| JP | 2005-053438 A | 3/2005 | |
| JP | 2007-024084 A | 2/2007 | |
| WO | WO 2005/003588 A1 | 1/2005 | |

OTHER PUBLICATIONS

Machine Translation of JP 2000-272447.*
Machine Translation of JP 11-286822.*
International Search Report of the International Searching Authority mailed on Feb. 24, 2009 for the corresponding international patent application No. PCT/JP2009/051270 (English translation enclosed).
Office Action dated Jul. 11, 2012 in corresponding JP Application No. 2009-552438 (and English translation).

* cited by examiner

SHOCK ABSORBING APPARATUS

CROSS REFERENCE TO RELATED APPLICATIONS

This application is a U.S. national stage application of PCT/JP2009/051270 filed on Aug. 4, 2009, and claims priority to, and incorporates by reference, Japanese Patent Application Nos. 2008-023932 filed on Feb. 4, 2008 and 2008-036303 filed on Feb. 18, 2008.

TECHNICAL FIELD

The present invention relates to a shock absorbing apparatus that is put in place inside door trims, front pillars, bumpers, and the like, and which absorbs shock energy at the time of collision, and so forth. A shock absorbing apparatus according to the present invention can be utilized not only for automotive applications but also for a variety of fields.

BACKGROUND

As conventional shock absorbing apparatuses, the following have been known heretofore: hydraulic buffering apparatuses in which pistons compress liquids, thereby relieving shocks; or those which absorb shock energies by pneumatic compression resistance while letting air escape through air pin holes; and the like.

Moreover, in recent years, many shock absorbing apparatuses have been used extensively, shock absorbing apparatuses which are made by disposing a large number of resinous ribs inside door trims, and which absorb shock energies by means of the buckling of the resinous ribs and the occurrence of cracks therein. As for these resinous ribs, the following have been general ones: those which comprise a bottomed cylindrical outer-wall portion and checkered ribs that are formed in the internal space of the outer-wall portion, and that divide the internal space into a plurality of minor compartments.

However, in the method where shocks are absorbed using the hydraulic buffering apparatuses, spring back acts thereon because there is no way out for the liquids to escape, and thereby it is difficult to absorb shock energies efficiently. Moreover, height dimensions are needed in directions in which impactive forces are applied.

Moreover, even in the case of using a hollow bellows-shaped shock absorber possessing an air pin hole and absorbing shock energies by pneumatic compression resistance while letting air escape through the air pin hole, height dimensions are also needed in directions in which impacts are applied, and thereby this method has not been applied to narrow parts and parts where any height dimensions are not adoptable.

Moreover, in those which shock energies are absorbed by means of the buckling of the resinous ribs and the occurrence of cracks therein, although buckled states occur stably by means of setting up the configuration and material quality of the resinous ribs suitably, the occurrence circumstances of cracks becomes unstable depending on the material quality and molding conditions, and the like. Accordingly, while being accompanied by the variations of the resinous ribs and so forth, it should be inevitable to vary the configuration of the resinous ribs for each of the variations, and consequently there is such a drawback that the costs and man-hour requirements for manufacturing the molds become enormous.

Hence, in Japanese Unexamined Patent Publication (KOKAI) No. 9-254,727, a shock absorbing apparatus is proposed therein, the shock absorbing apparatus comprising: a main body, which possesses a hollow section that is surrounded by a plate-shaped outer wall portion; an inclusion, which is filled in the hollow section and in which a liquid makes the major component; and a through hole, which is disposed in the main body so as to communicate the hollow section with the outside and through which the inclusion is discharged to the outside gradually by means of a force of shock that is applied to the main body; and the shock absorbing being constituted so as to absorb the shock by means of resistance that arises when the inclusion passes through the through hole.

In accordance with this shock absorbing apparatus, with respect to smaller shocks, the inclusion moves within the hollow section as being accompanied by the deformation of the main body, and accordingly buffering effect is produced by means of this setting. On the other hand, when larger shock energies are applied to the main body, the volume of the hollow section is reduced by means of the deformation of the main body, and consequently the inclusion is pushed out through the through hole by means of stresses that are accompanied therewith. And, frictional resistance acts on the inclusion when it passes through the through hole; accordingly the volume of the hollow section is reduced gradually as being accompanied by the inclusion that is pushed out gradually; and consequently it is possible to absorb shock energy efficiently by means of this setting.

Furthermore, in Japanese Unexamined Patent Publication (KOKAI) No. 11-139,341, a shock absorbing apparatus is set forth therein, shock absorbing apparatus which is equipped with a first absorbing portion for absorbing shock energy by means of buckling ribs, and a second absorbing portion for absorbing shock energy by means of circulation resistance upon discharging an inclusion to the outside.

Moreover, in Japanese Unexamined Patent Publication (KOKAI) No. 2000-272,447, a shock absorbing apparatus is set forth therein, shock absorbing apparatus which comprises a housing portion that is capable of deforming plastically and a fluid that is accommodated within the housing portion, and which absorbs shock energy by means of resistance resulting from the fluid being discharged through a minor-diameter hole, which is disposed in the housing portion, by means of housing inner-pressure rise when shock acts thereon.

Patent Literature No. 1: Japanese Unexamined Patent Publication (KOKAI) No. 9-254,727;
Patent Literature No. 2: Japanese Unexamined Patent Publication (KOKAI) No. 11-139,341; and
Patent Literature No. 3: Japanese Unexamined Patent Publication (KOKAI) No. 2000-272,447

Incidentally, in the case of a shock absorbing apparatus that absorbs shock by means of the buckling of ribs, when it collides with a colliding object, such as the head of a human body or the like that has curved surfaces, for instance, the colliding object, and the shock absorbing apparatus make a point contact at first, and thereby one of the ribs buckles; and thereafter the contact area augments gradually because the colliding object compresses the shock absorbing apparatus, and thereby a plurality of the ribs buckle. Meanwhile, as a result of the action that shock energy is absorbed by means of the buckling of the ribs, the energy that the colliding object possesses decreases gradually.

That is, the contact area comes to augment contrary to the gradually decreasing energy that the colliding object possesses, and thereby a force that is applied to a unit area of the shock absorbing apparatus decreases acceleratedly. Accordingly, at a later stage in absorbing the shock, it becomes difficult to buckle the ribs, and so there has been such a problem that the "bottom sticking" phenomenon occurs as a consequence so that the reactive force from the shock absorbing apparatus augments.

Moreover, there might also be such another problem that, at a later stage in absorbing the shock, the debris of the ribs intervene between the pressure-receiving plate portion, which has received the shock, and the facing plate portion, which faces the pressure-receiving plate portion, because the debris of the buckled ribs come to remain in the hollow section; accordingly, load rises sharply at the time when the pressure-receiving plate portion and facing plate portion come in contact with the debris of the ribs, and consequently results in the problem that the "bottom sticking" phenomenon occurs so that the reactive force from the shock absorbing apparatus augments.

On the other hand, in shock absorbing apparatuses, an energy amount that is absorbed while they undergo compression deformation is important; this energy amount can be expressed with an area under a load-stroke curve. That is, the longer a shock-absorbing stroke, a distance that enables them to be deformed by compression, is, the greater an absorbing shock amount becomes. However, in the conventional shock absorbing apparatus, the shock-absorbing stroke should be set up larger while making an allowance for the height in the aforementioned debris of the ribs, and so it has been needed to design the stroke greater by a certain extent of the height in the debris of the ribs. Accordingly, it becomes a large-size shock absorbing apparatus, and consequently there might have been such still another problem that a greater disposition space becomes necessary.

SUMMARY

The present invention is one which has been done in view of the aforementioned circumstances, and it aims at making an absorbable energy amount greater even when a shock-absorbing stroke is equivalent to that of the conventional ones.

A characteristic of a shock absorbing apparatus according to the present invention which solves the aforementioned assignment lies in that it comprises:

a pressure-receiving plate portion to which shock is applied;

a facing plate portion facing the pressure-receiving plate portion and being separated therefrom by an interval; and checkered ribs not only connecting the pressure-receiving plate portion with the facing plate portion but also demarcating a plurality of minor compartments between the pressure-receiving plate portion and the facing plate portion;

the multiple minor compartments comprising:
  filled minor compartments being filled with an inclusion in which a liquid makes the major component;
  vacant minor compartments being filled with the air;
  at least one of the vacant minor compartments adjoining the filled minor compartments; and
  a fragile section being formed in at least one of the ribs that demarcate the filled minor compartments and the adjoining vacant minor compartments;
  wherein not only the ribs buckle to absorb shock energy but also the inclusion is compressed to further absorb the shock energy when shock is applied in such a direction that brings the pressure-receiving plate portion and the facing plate portion closer to each other; and
  the shock energy is furthermore absorbed by means of circulation resistance to the inclusion that flows from the filled minor compartments to the vacant minor compartments after the fragile section has fractured.

A characteristic of another shock absorbing apparatus according to the present invention which solves the aforementioned assignment lies in that it comprises:

a main body, which possesses a hollow section that is surrounded by a plate-shaped outer wall portion;

an inclusion, which is filled in the hollow section and in which a liquid makes the major component; and a through hole, which is disposed in the main body so as to communicate the hollow section with the outside and through which the inclusion is discharged to the outside gradually by means of a force of shock that is applied to the main body; and it is constituted so as to absorb the shock by means of resistance that arises when the inclusion passes through the through hole;

the main body has a pressure-receiving plate portion to which the shock is applied, and a facing plate portion facing the pressure-receiving plate portion and being separated therefrom by an interval; but the main body does not possess any ribs protruding into the hollow section, or any ribs demarcating the hollow section;

wherein the main body is deformed by means of the shock in such a direction that brings the pressure-receiving plate portion and the facing plate portion closer to each other, and then the pressure-receiving plate portion comes closer to the facing plate portion boundlessly.

In accordance with the first shock absorbing apparatus according to the present invention, a colliding object and the pressure-receiving plate portion first make a point contact, and then shock energy is absorbed by the ribs that deform, and by the inclusion that is compressed. In a case where the shock energy is greater than those being absorbed by such an extent, one of the ribs, which is the closest to the contact point, first buckles, and thereafter the contact area augments gradually because the colliding object presses the pressure-receiving plate portion, and so a plurality of the ribs buckle. And, the shock energy is absorbed by the deformations of the ribs and the compression of the inclusion.

And, as a result of the action that the shock energy is absorbed, although energy that the colliding object possesses decreases gradually, the contact area between the colliding object and the shock absorbing apparatus augments, and thereby a force that is applied to per unit area of the shock absorbing apparatus decreases acceleratedly. However, in that process, the fragile section of the ribs fractures, and thereby the inclusion flows into the adjoining vacant minor compartments through the resulting fractured section. Therefore, not only the spring back resulting from the compression of the inclusion dissolves, but also the shock energy is absorbed by means of circulation resistance to the inclusion.

By making energy, which is absorbed by means of circulation resistance to the inclusion, smaller than energy, which is absorbed by means of the buckling of the ribs or the compression of the inclusion, it is possible to absorb the shock energy efficiently even when the shock energy, which is applied to per unit area of the shock absorbing apparatus, has decreased. As a result, it is possible to absorb the shock energy even at a later stage in absorbing the shock, and thereby it is possible to retard the occurrence of the "bottom sticking" phenomenon.

Although it is allowable that there can be such cases that the other filled minor compartments adjoin the filled minor compartments, it is difficult for the inclusion to flow into the adjoining filled minor compartments. Therefore, it is desirable that only a plurality of the vacant minor compartments can adjoin the filled minor compartments.

It is preferable that the filled minor compartments, and the vacant minor compartments can make a cylindrical shape whose cross section is a regular hexagon. By doing thusly, it is possible to dispose the filled minor compartments and vacant minor compartments densely as a honeycomb shape, and thereby the right-angle-wise strength with respect to impact directions upgrades. Moreover, it is possible to make the inclusion flow into one to six pieces of the vacant minor compartments that adjoin one of the filled minor compartments, and then it becomes feasible to control an amount of absorbed energy by controlling the number of the vacant minor compartments into which the inclusion flows.

When the fragile section is made into a through hole, there might arise such a case that it becomes difficult to absorb the energy of shock by means of compressing the inclusion at an initial stage in absorbing the shock. Therefore, it is desirable that the fragile section can be made into a thin-walled section, or a notch.

It is desirable that the fragile section can be formed in the vicinity of one of the opposite bottom plates. By doing thusly, it is possible to avoid the disadvantage that the inclusion is compressed after the fragile section has fractured.

Furthermore, it is also preferable to possess a secondary vacant minor compartment that adjoins one of the vacant minor compartments, and that another fragile section can be formed also in one of the ribs that demarcates the one of the vacant minor compartments and the secondary vacant minor compartment adjoining therewith. By doing thusly, it is possible to retard the occurrence of the "bottom sticking" phenomenon furthermore, because it is possible to absorb the energy of shock by means of circulation resistance to the inclusion due to the action that the fragile section fractures when the inclusion is compressed again in a later stage of absorbing the shock.

Moreover, in a case where the vacant minor compartments should have been filled with the inclusion, it is allowable to dispose a secondary fragile section, by way of which the inclusion is discharged to the outside, in the bottom of the vacant minor compartments, in order to dissolve the "bottom sticking" phenomenon resulting from the inclusion.

And, in accordance with the second shock absorbing apparatus according to the present invention, shock causes deformation in such a direction that brings the pressure-receiving plate portion and the facing plate portion closer to each other, and then the pressure-receiving plate comes closer to the facing plate boundlessly. That is, since no debris of the ribs occur as those occur in the conventional ones, it is possible to make a distance between the pressure-receiving plate portion and the facing plate portion into a shock-absorbing stroke. Therefore, it becomes feasible to make an absorbable energy amount greater even when a shock-absorbing stroke is equivalent to that of the conventional ones, and thereby it becomes feasible to downsize the configuration even when the two absorbable energy amounts are equivalent to each other.

DETAILED DESCRIPTION

Figure 1:
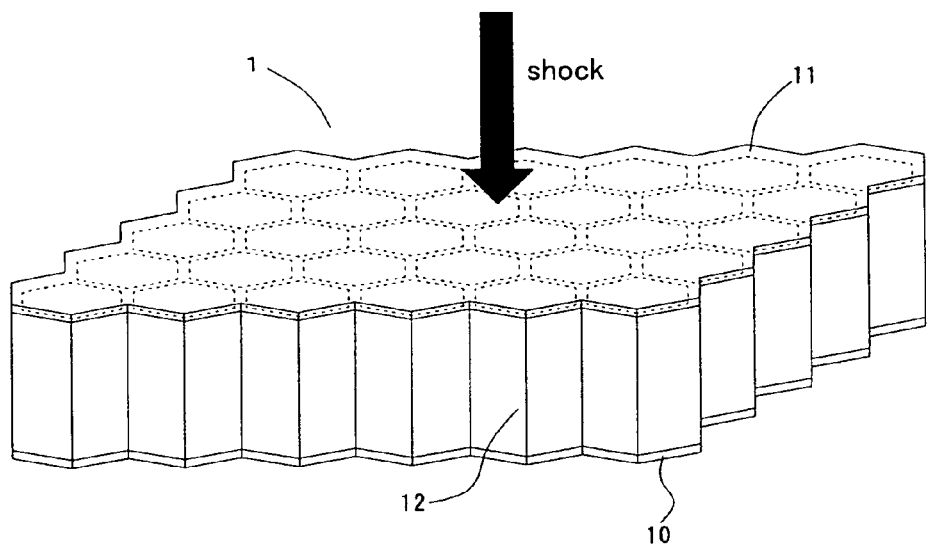
FIG. 1 is a perspective diagram of a shock absorbing apparatus that is directed to one of examples according to the present invention.

In the first shock absorbing apparatus according to the present invention, with respect to smaller shock, the inclusion moves within the filled minor compartments as the ribs deform, and accordingly buffering effect is produced by means of this setting. On the other hand, when larger shock energy is applied, the volume of the filled minor compartments is reduced by means of the ribs that buckle, and consequently the shock energy is absorbed by the inclusion that is compressed. When much larger shock energy is applied, the fragile section fractures so that the inclusion is pushed out to one of the adjoining vacant minor compartments. And, frictional resistance acts on the inclusion when it passes through the resultant fractured section; accordingly the volume of the filled minor compartments is reduced gradually as the inclusion is pushed out gradually; and consequently the shock energy is absorbed by means of this setting.

The magnitude of the shock energy being absorbed herein is determined by means of the strength of the ribs, the volume of the minor compartments, the viscosity of the inclusion, the diameter and plane roughness of a through hole that is formed when the fragile section has fractured, and the like, but is hardly dependent on material qualities, forming methods, and so forth. Therefore, it is possible to form the shock absorbing apparatus inexpensively, and to make it less expensive.

The first shock absorbing apparatus according to the present invention comprises a pressure-receiving plate portion to which shock is applied, a facing plate portion facing the pressure-receiving plate portion and being separated therefrom by an interval, and checkered ribs not only connecting the pressure-receiving plate portion with the facing plate portion but also demarcating a plurality of minor compartments between the pressure-receiving plate portion and the facing plate portion. Although a cross-sectional configuration of the minor compartments is not limited in particular, it is desirable to make it into a polygonal configuration, such as triangles, quadrangles and hexagons, in the cross section because it is desirable to put the respective minor compartments in place densely. It is allowable that the minor compartments possessing different cross-sectional configurations can even be present mixedly.

Resinous materials that can be molded readily are preferable as for a material quality of the bottom plates and ribs, but it is possible to utilize paper-quality materials or woody materials, and the like, depending on cases. Moreover, a volume of the minor compartments can be set up suitably in compliance with purposes.

The multiple minor compartments comprise filled minor compartments being filled with an inclusion in which a liquid makes the major component, vacant minor compartments being filled with the air, at least one of the vacant minor compartments adjoining the filled minor compartments, and a fragile section being formed in at least one of the ribs that demarcate the filled minor compartments and the adjoining vacant minor compartments.

It is desirable that no other filled minor compartments can adjoin the filled minor compartments and only a plurality of the vacant minor compartments can adjoin them. By doing thusly, it is possible to disperse an absorbing range of shock energy that results from the compression of the inclusion, and thereby it is possible to restrain spring back. Moreover, a degree of freedom enhances as well concerning the location on which the fragile section is provided.

It is desirable to possess another vacant minor compartment, and that a secondary fragile section can be formed also in one of the ribs that demarcates the one of the vacant minor compartments and the other vacant minor compartment. By doing thusly, it is possible to retard the occurrence of "bottom sticking" phenomenon furthermore, because it is possible to absorb the energy of shock by means of circulation resistance to the inclusion due to the action that the secondary fragile section fractures when the inclusion is compressed again at a later stage in absorbing the shock.

The fragile section is one which fractures to enable the inclusion to circulate when an inner pressure of the inclusion exceeds a predetermined value, and it is possible to make it into thin-walled sections, notches, slits, and the like. Depending on cases, it is also possible to make valves into the fragile section. Moreover, it is even possible to make a fragile section in which these are used combinedly; when it is made into a thin-walled section, it is also allowable to make it into a thin-walled section whose thickness changes stepwise or continuously.

This fragile section is formed in at least one of the ribs that demarcate the filled minor compartments and the adjoining vacant minor compartments. It is even allowable to form the fragile section in all of the ribs that demarcate the filled minor compartments and the adjoining vacant minor compartments, or it is also permissible if there can be present some, which do not possess the fragile section, in the ribs that demarcate the filled minor compartments and the adjoining vacant minor compartments.

It is preferable that the fragile section can be formed in the vicinity of the pressure-receiving plate portion or facing plate portion, and it is desirable that it can be formed in the vicinity of the facing plate portion. By doing thusly, it is possible to avoid the phenomenon that the inclusion is compressed again within the vacant minor compartments after the fragile section has fractured, and thereby it is possible to avoid spring back.

The inclusion is one of those in which a liquid makes the major component; it is possible to use the following as they are: water; volatile liquids like various organic solvents; oils; glycols; glycerin; plasticizers like DOP; fluidized paraffin; nonvolatile liquids like water glass; starch syrups; resins being in liquid form at ordinary temperature; highly-viscous liquids like greases; and the like. Moreover, not using a liquid alone, it is even allowable to use sols, or slurries in which various powders are dispersed in water or organic solvents, and so forth.

As for this inclusion, it is preferable to use water that is harmless and inexpensive. However, when using water alone, if clearances might arise because of molding errors, and the like, there might be a case where water leaks through those clearances. Moreover, there might be such a problem that absorbable energy is small extremely, because the circulation resistance is small when water passes through the fractured fragile section.

Hence, it is desirable especially that the inclusion can be constituted of a gelatinous body. When making it into a gelatinous body, since flowability is hardly available upon being subjected to smaller shock, the leakage can be prevented even if clearances should have arisen. And, when larger shock is applied, since the gelatinous body can be destroyed readily, it becomes feasible for it to pass through the fractured fragile section, and thereby the circulation resistance enhances as well in passing therethrough.

As for such a gelatinous body, it is possible to select the following variously and then use one of them in compliance with purposes: from soft gels like "TOFU" to medium-hard gels being in agar form like "Konjac," or to hard gels like jellies, for instance.

In the second shock absorbing apparatus according to the present invention, with respect to smaller shock, the inclusion moves within the hollow section as the main body deforms, and accordingly buffering effect is produced by means of this setting. On the other hand, when larger shock energy is applied to the main body, the volume of the hollow section is reduced by means of the main body that deforms, and consequently the inclusion is pushed out through the through hole by means of stress being accompanied therewith. And, frictional resistance acts on the inclusion when it passes through the through hole; accordingly the volume of the hollow section is reduced gradually as the inclusion is pushed out gradually; and consequently it is possible to absorb shock energy efficiently by means of this setting.

The magnitude of the shock energy being absorbed herein is determined by means of the strength of the main body, the volume of the hollow section, the viscosity of the inclusion, the diameter and plane roughness of the through hole, and the like, but is hardly dependent on material qualities, forming methods, and so forth. Therefore, it is possible to form the main body inexpensively, and to make the shock absorbing apparatus it less expensive.

The main body is one which has a pressure-receiving plate portion to which the shock is applied, and a facing plate portion facing the pressure-receiving plate portion and being separated therefrom by an interval; but which does not possess any ribs protruding into the hollow section, or any ribs demarcating the hollow section; and which is deformed by means of the shock in such a direction that brings the pressure-receiving plate portion and the facing plate portion closer to each other, and then the pressure-receiving plate portion comes closer to the facing plate portion boundlessly.

For example, it is possible to make a main body in which the pressure-receiving plate portion and the facing plate portion are put in place parallelly to each other; in which a pair of inclined side plates connect the pressure-receiving plate portion with the facing plate portion; and whose cross section is a parallelogrammatic shape. It is allowable to dispose the through hole anywhere. When making such a main body, a distance between the pressure-receiving plate portion and the facing plate portion makes a shock-absorbing stroke, because the paired inclined side plates are deformed so as to fall down forwards to each other in acute-angle directions by means of shock and then the pressure-receiving plate portion and the facing plate overlap each other eventually.

Moreover, it is possible to give the side plates, which connect the pressure-receiving plate portion with the facing plate portion, a cross-sectionally "hand drum"-shaped structure that heads for the inside of the hollow section so as to go into it in a cross-sectionally "dogleg" configuration. In this case, at the time of impact, the side plates go into the hollow section furthermore while heading for the inside, and accordingly the pressure-receiving plate portion and facing plate portion deform in such directions that they come closer to each other. However, in this structure, the side plates, which have been folded up, come to intervene between the pressure-receiving plate portion and the facing plate portion in a later stage of shock absorption, and consequently the shock-absorbing stroke becomes smaller by a summed thickness of those of the side plates that have been folded up. Therefore, it is desirable that all of the plate members cannot be headed for the inside of the hollow section so as to go into it, and that the side plates can deform so as to swell out outwardly at the time of deformation.

Resinous materials that can be molded readily are preferable as for a material quality of the main body, but it is possible to utilize paper-quality materials or woody materials, and the like, depending on cases. Moreover, it is also allowable to use a soft resinous material that cannot be damaged by means of shock energy, but that is capable of reducing a volume of the hollow section by means of plastic deformation or elastic deformation. In addition, the volume of the hollow section can be set up suitably in compliance with purposes.

The inclusion is one of those in which a liquid makes the major component; it is possible to use the following as they are: water; volatile liquids like various organic solvents; oils; glycols; glycerin; plasticizers like DOP; fluidized paraffin; nonvolatile liquids like water glass; starch syrups; resins being in liquid form at ordinary temperature; highly-viscous liquids like greases; and the like. Moreover, not using a liquid alone, it is even allowable to use sols, or slurries in which various powders are dispersed in water or organic solvents, and so forth.

As for this inclusion, it is preferable to use water that is harmless and inexpensive. However, when using water alone, if clearances might arise because of molding errors, and the like, there might be a case where water leaks through those clearances. Moreover, since it is likely to be leaked through the through hole as well, a sealing structure might become necessary in many cases.

Hence, it is desirable especially that the inclusion can be constituted of a gelatinous body. When making it into a gelatinous body, since flowability is hardly available upon being subjected to smaller shock, the leakage can be prevented even if clearances should have been present in the main body. And, when larger shock is applied, since the gelatinous body can be destroyed readily, it becomes feasible for it to flow out through the through hole, and thereby it is possible to absorb shock energy.

As for such a gelatinous body, it is possible to select the following variously and then use one of them in compliance with purposes: from soft gels like "TOFU" to medium-hard gels being in agar form like "Konjac," or to hard gels like jellies, for instance.

EXAMPLES

Hereinafter, the present invention will be explained in detail by means of examples.

Example No. 1

A shock absorbing apparatus according to the present example is illustrated in FIG. 1. This shock absorbing apparatus is constituted of a facing plate portion 10, a pressure-receiving plate portion 11 that is separated from the facing plate portion 10 by an interval and is put in place parallelly thereto, and checkered ribs 12 that not only connect between the facing plate portion 10 and the pressure-receiving plate portion 11 but also divide a space being formed between the facing plate portion 10 and the pressure-receiving plate portion 11 into a plurality of minor compartments. The minor compartments, which are formed by the checkered ribs 12 as well as the facing plate portion 10 and pressure-receiving plate section 11, make a regular hexagon in the cross section, respectively; and are formed as a honeycomb shape as a whole.

Figure 2:
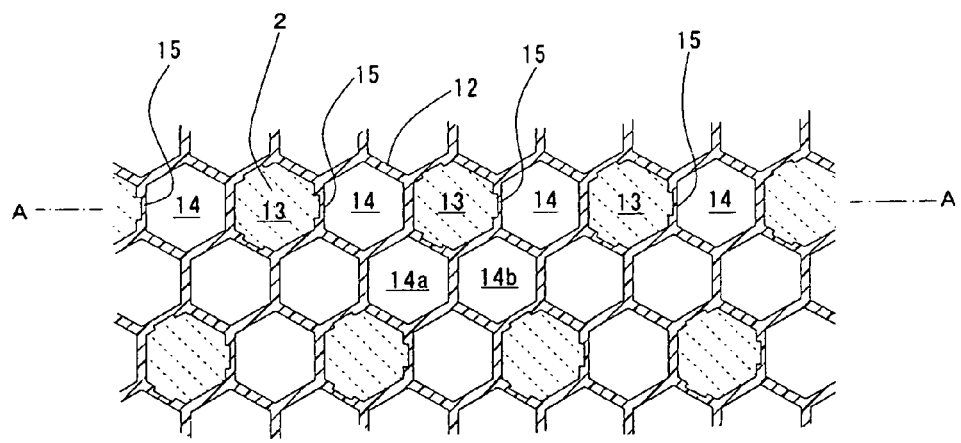
FIG. 2 is a cross-sectional diagram of the shock absorbing apparatus that is directed to the one of examples according to the present invention.
Figure 3:
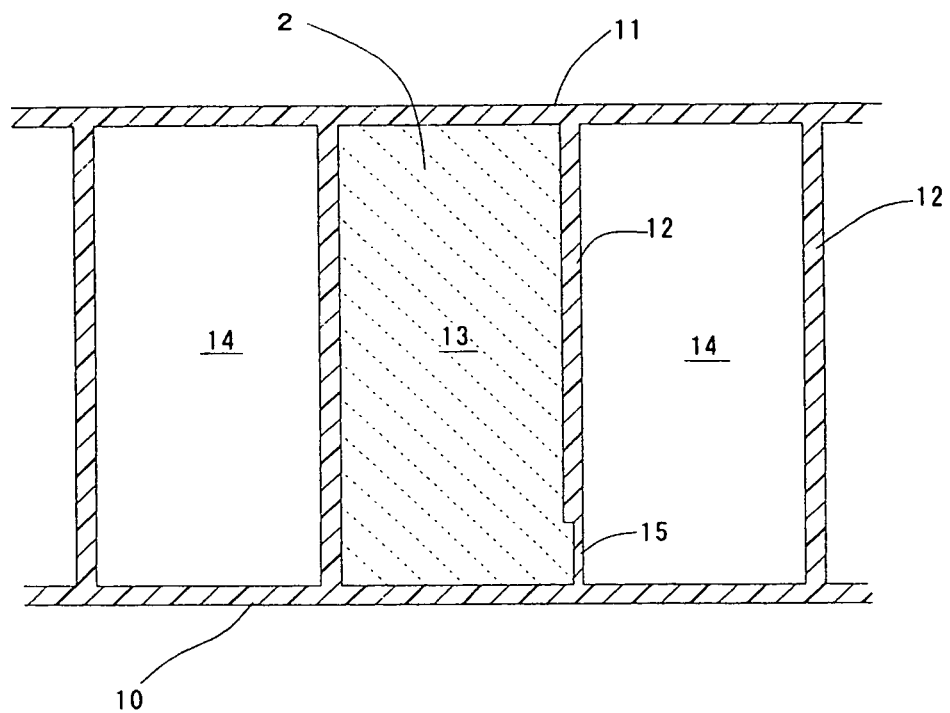
FIG. 3 is a cross-sectional diagram of an enlarged major part of the shock absorbing apparatus that is directed to the one of examples according to the present invention.

The multiple minor compartments, as FIG. 2 illustrates their cross sections, comprise: filled minor compartments 13 that are filled with an inclusion 2; vacant minor compartments 14 that are not filled with anything but in which the air is sealed; and the vacant minor compartments 14 adjoin around each of the filled minor compartments 13, respectively, at positions that correspond to the respective sides of their hexagonal cross section. Moreover, each of thin-walled sections 15 is formed at a part, which comes in contact with the facing plate portion 10 as shown in FIG. 3 in an enlarged manner, in three of the ribs 12 that are present alternately in six of the rib 12 that demarcate the filled minor compartments 13. The thickness of the ribs 12 is 1.8 mm, and the thickness of the thin-walled sections 15 is 1.0 mm.

The inclusion 2, which comprises a gel that is formed by having a water-absorbing resinous powder absorb water, is filled and then sealed in the filled minor compartments 13.

This shock absorbing apparatus 1 is formed of polyolefin-based resin, and is manufactured by first forming a member, which comprises the pressure-receiving plate portion 11 and the ribs 12 possessing the thin-walled sections 15, by means of injection molding, and then filling the hollow sections, which correspond to the filled minor compartments 13, with the inclusion 2, and thereafter by welding the facing plate portion 10.

Figure 4:
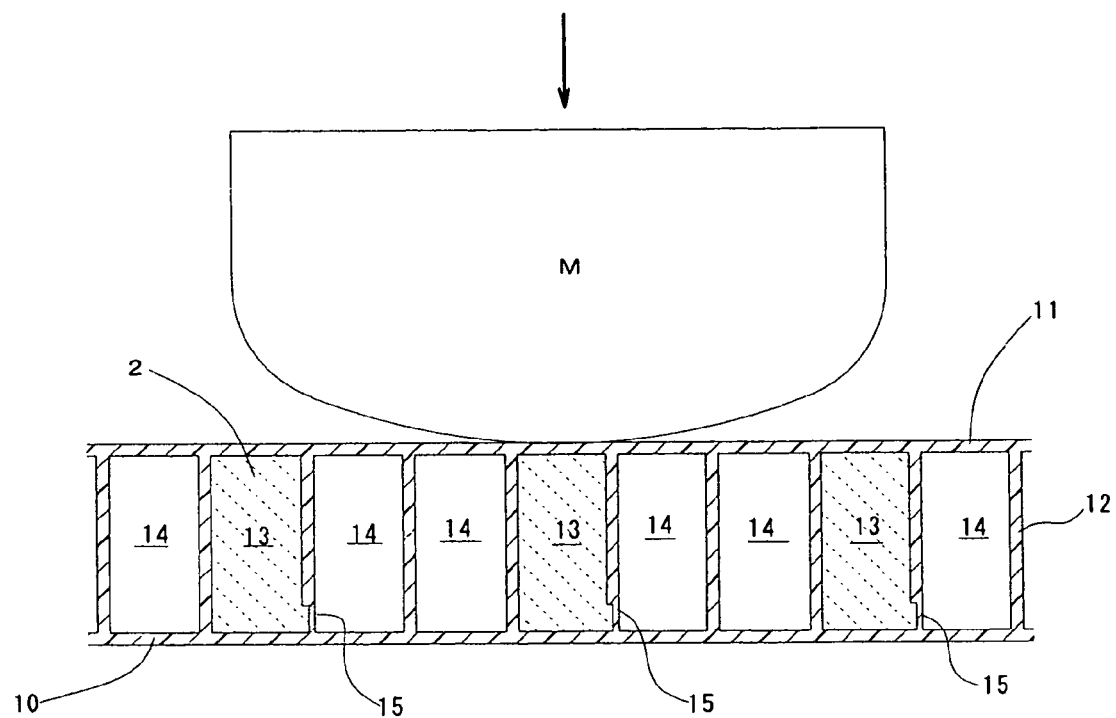
FIG. 4 is an explanatory cross-sectional diagram for illustrating a state in which a colliding object has come in contact with the shock absorbing apparatus that is directed to the one of examples according to the present invention.

The shock absorbing apparatus 1 according to the present example is used while being put in place so that shock loads act on the pressure-receiving plate portion 11 as illustrated in FIG. 1. At the time of impact, a colliding object "M" first comes in contact with the pressure-receiving plate portion 11 as shown in FIG. 4, and then presses the pressure-receiving plate portion 11 toward the facing plate section 10. The "A"-"A" cross section in FIG. 2 is illustrated in FIG. 4.

Figure 5:
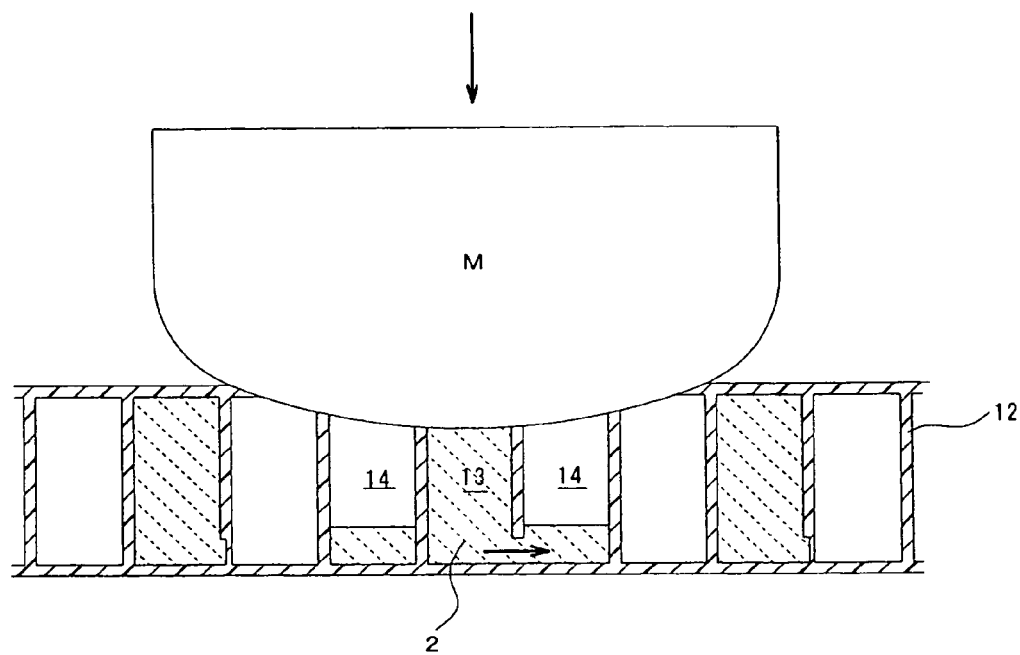
FIG. 5 illustrates an early state in which the colliding object has intruded into the shock absorbing apparatus that is directed to the one of examples according to the present invention, and is an explanatory cross-sectional diagram that is equivalent to the "A-A" cross section in FIG. 2.

At an early stage of the impact, shock energy is absorbed by means of the flexure deformation of the ribs 12 and the compression of the inclusion 2. When the shock energy is greater than the resultant absorbed energy, the colliding object "M" intrudes into the shock absorbing apparatus 1 as illustrated in FIG. 5, and then the shock energy is absorbed because the ribs 12 that are positioned under it buckle. Moreover, since the inner pressure of the inclusion 2, which is sealed in the filled minor compartments 13, enhances so that the thin-walled sections 15 are fractured by means of the resulting pressure, the inclusion 2 flows into the vacant minor compartments 14 from the filled minor compartments 13 via the fractured sections. The shock energy is absorbed by means of circulation resistance, which occurs on that occasion, as well.

Therefore, the shock energy is absorbed by means of both of the buckling of the ribs 12 and the circulation resistance to the inclusion 2, and thereby high shock absorbing performance is demonstrated. However, as a result of the action that the shock energy is absorbed, although the energy that the colliding object "M" possesses decreases gradually, a contact area between the colliding object "M" and the shock absorbing apparatus 1 augments, and accordingly a force that is applied to per unit area of the shock absorbing apparatus 1 decreases acceleratedly. Consequently, there might arise a case where it becomes difficult to buckle the ribs 12 at a later stage of shock absorbing; moreover, spring back resulting from the inclusion 2 that is sealed in the filled minor containers 13 might also be afraid of.

Figure 6:
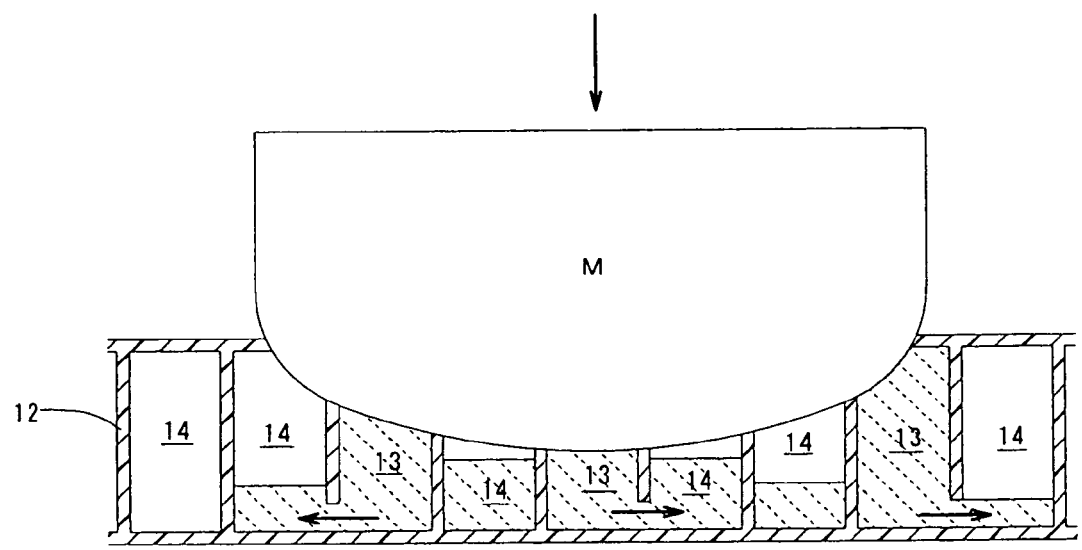
FIG. 6 illustrates an intermediate state in which the colliding object has intruded into the shock absorbing apparatus that is directed to the one of examples according to the present invention, and is an explanatory cross-sectional diagram that is equivalent to the "A-A" cross section in FIG. 2.

However, in accordance with the shock absorbing apparatus 1 according to the present example, since the ribs 12 to be buckled have buckled already and the thin-walled sections 15 have fractured already as illustrated in FIG. 6 even when the colliding object "M" intrudes into it furthermore, it is possible to absorb the shock energy by means of circulation resistance on such an occasion that the inclusion 12 flows into the vacant minor compartments 14 through the fractured thin-walled sections 15. Moreover, it is possible to absorb the shock energy more effectively by means of using a gel that exhibits shock absorbing performance as the inclusion 2. Therefore, even when the force that is applied to per unit area of the shock absorbing apparatus 1 is small, it is possible to absorb the shock energy furthermore, and thereby it is possible to retard the "bottom sticking" phenomenon to occur.

Example No. 2

However, in the shock absorbing apparatus 1 according to Example No. 1, there might arise a case where it is difficult for the inclusion 2, which has flowed into the vacant minor compartments 14 through the fractured thin-walled sections 15, to flow out from the vacant minor compartments 14. For example, although the vacant minor compartment 14a specified in FIG. 2 allows the inclusion 2 to flow into it from one of the adjoining filled minor compartments 13, but it is not possible for the inclusion 2 to flow out from it to the other adjoining vacant minor compartment 14b, and the like. Therefore, in a case where the colliding object "M" intrudes into it furthermore so that it comes in contact with the inclusion 2 in the filled minor compartments 13 and vacant minor compartments 14 that are communicated with each other by way of the fractured thin-walled sections 15, the inclusion 2 comes to be compressed so that the spring back might be afraid of.

Figure 7:
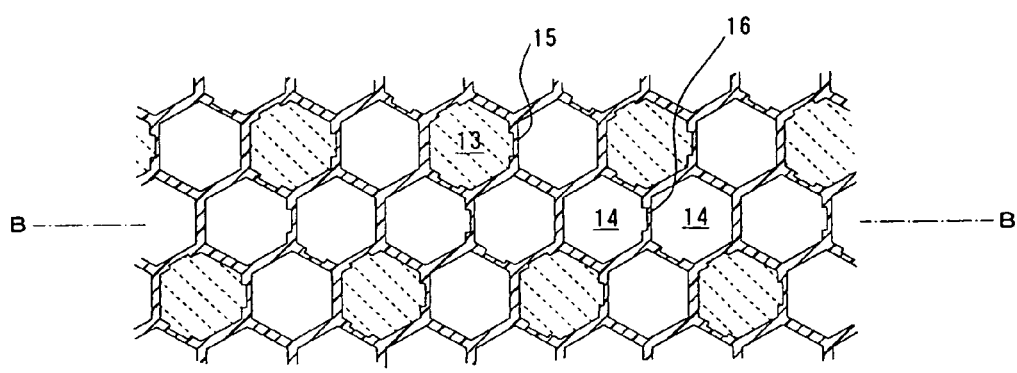
FIG. 7 is a cross-sectional diagram of a shock absorbing apparatus that is directed to a second example according to the present invention.
Figure 8:
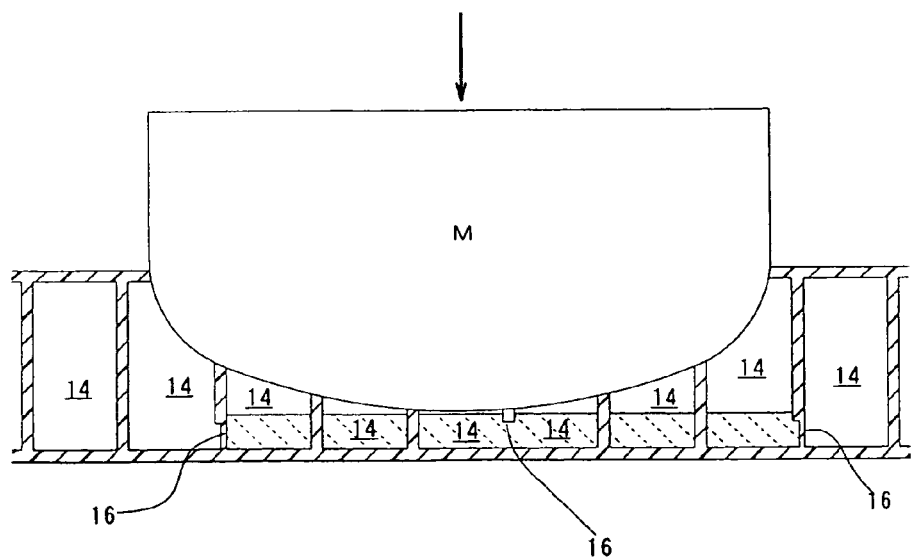
FIG. 8 illustrates an intermediate state in which a colliding object has intruded into the shock absorbing apparatus that is directed to the second example according to the present invention, and is an explanatory cross-sectional diagram that is equivalent to the "B-B" cross section in FIG. 7.

Hence, in a shock absorbing apparatus according to the present example, a secondary thin-walled section 16 is formed in the ribs 12, which divide between the vacant minor compartments 14 that adjoin each other, as illustrated in FIG. 7. By means of configuring thusly, the inclusion 2 disperses into a plurality of the vacant minor compartments 14 via the thin-walled sections 15 and thin-walled sections 16 that have fractured. Therefore, even in a case where the colliding object "M" intrudes into it furthermore as illustrated in FIG. 8, since the colliding object "M" is retarded to come in contact with the liquid level of the inclusion 2 so that the inclusion 2 is retarded to be compressed, it is possible to retard the occurrence of "bottom sticking" phenomenon furthermore. Note that the "B"–"B" cross section in FIG. 7 is illustrated in FIG. 8.

Example No. 3

Figure 9:
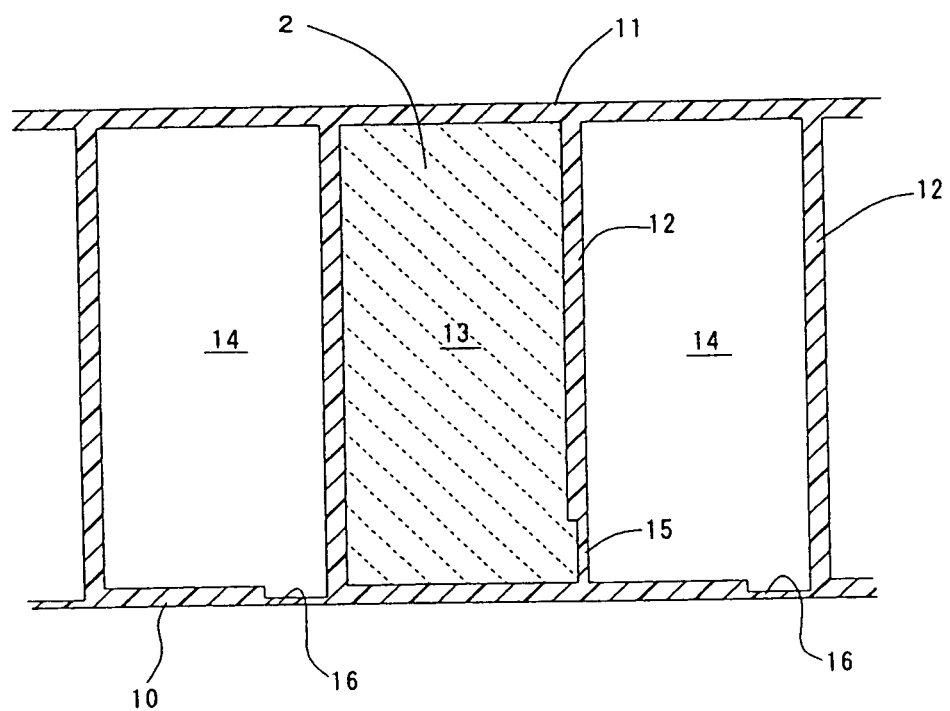
FIG. 9 is a cross-sectional diagram of an enlarged major part of a shock absorbing apparatus that is directed to a third example according to the present invention.

Except that secondary thin-walled sections 16 specified in FIG. 9 are formed at parts that face the vacant minor compartments 14 in the facing plate portion 10, a shock absorbing apparatus according to the present example is configured in the same manner as Example No. 1.

In accordance with the shock absorbing apparatus according to the present example, when the thin-walled sections 15 have fractured so that the inclusion 2 fills up the vacant minor compartments 14 and is then compressed furthermore, the secondary thin-walled sections 16 fracture so that the inclusion 2 is discharged to the outside through the resultant fractured sections. Therefore, it is possible to dissolve the "bottom sticking" phenomenon that results from the inclusion 2.

Example No. 4

Figure 10:
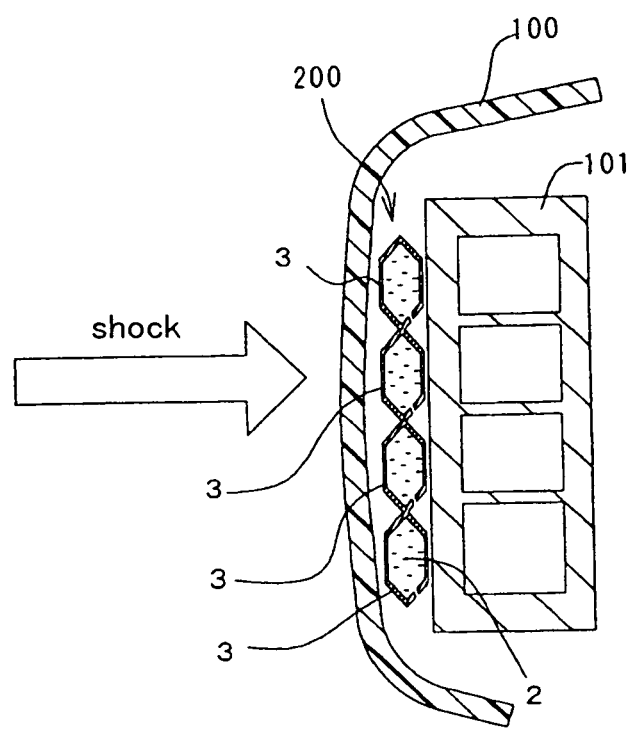
FIG. 10 is a cross-sectional diagram for illustrating the bumper section of automobile in which a shock absorbing apparatus that is directed to a fourth example according to the present invention is put in place.

In FIG. 10, there is illustrated a cross-sectional diagram on a major part of automobile that uses a shock absorbing apparatus according to the present example. A reinforcement 101 is integrated with the automobile's body, and is then put in place inside a front bumper 100. A shock absorbing apparatus 200 according to the present example is put in place between the front bumper 100 and the reinforcement 101.

Figure 11:
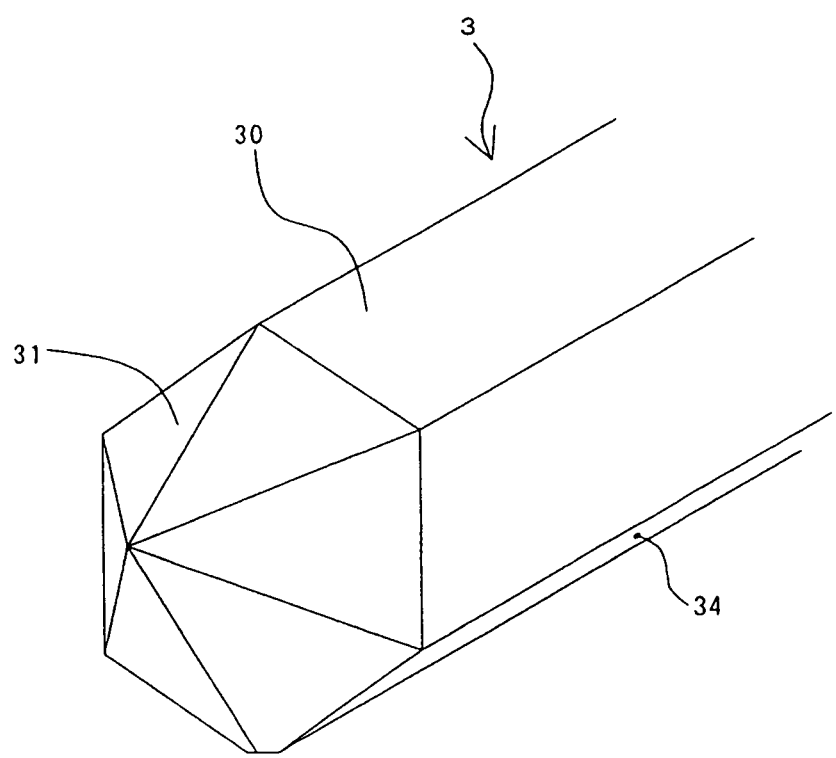
FIG. 11 is a perspective diagram of a major part of a unitary shock-absorbing member being used for the shock absorbing apparatus that is directed to the fourth example according to the present invention.

As illustrated in FIG. 11, this shock absorbing apparatus 200 is one which is completed by connecting a unitary shock-absorbing member 3 with a hexagonal columnar configuration in a plurality of pieces; and the unitary shock-absorbing members 3 are connected with each other between their side faces. The unitary shock-absorbing members 3 are put in place so as to be present extendedly in the longitudinal direction of the front bumper 100, respectively.

Each of the unitary shock-absorbing members 3 comprises a cylindrical portion 30 with a hexagonal cross section, and a pair of end portions 31 that are joined to the opposite ends of the cylindrical portion 30 to plug the openings. The end portions 31 plug the openings in the following manner: the six walls of the cylindrical portion 30 protrude from the openings outward in the longitudinal direction and then extend toward the axial center to reduce the cross section gradually; and the respective walls converge into one point at a position that is separated from the cylindrical portion 30 by a predetermined distance. Therefore, an enclosed hollow section is formed inside the unitary shock-absorbing members 3, respectively.

The cylindrical portion 30 is formed of polyolefin-based resin by means of extrusion molding. Moreover, the end portions 31 are formed of polyolefin-based resin by means of press molding, and are then welded to the opposite ends of the cylindrical portion 30, respectively, and thereby the respective unitary shock-absorbing members 3 are formed.

An inclusion 2, which comprises a gel that is formed by having a water-absorbing resinous powder absorb water, is filled and then sealed in the hollow section inside each of the unitary shock-absorbing members 3.

Figure 12:
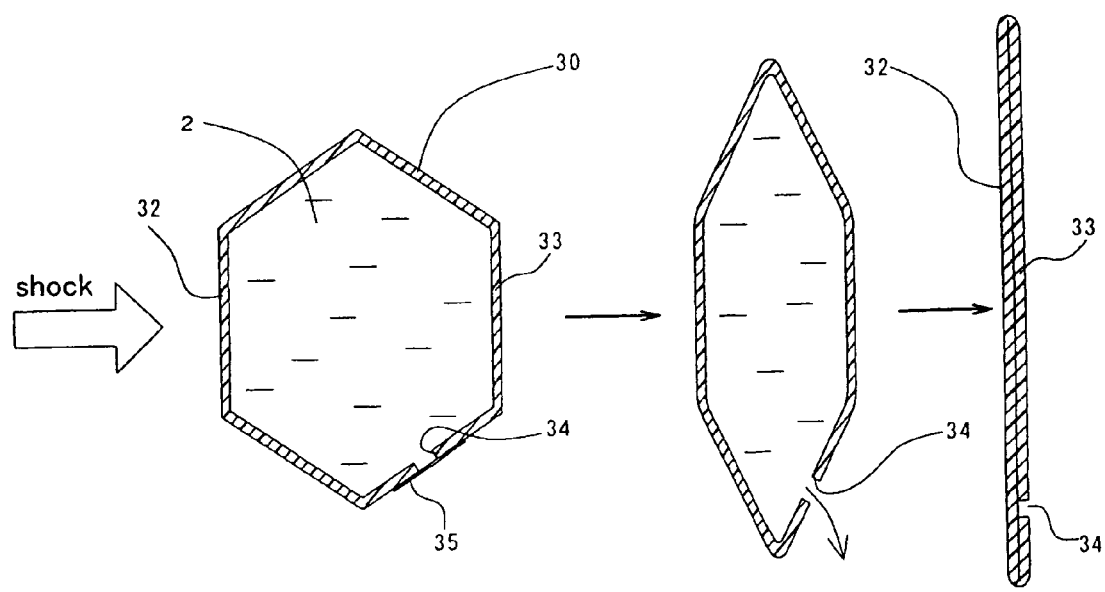
FIG. 12 is cross-sectional diagrams for illustrating deforming processes of the unitary shock-absorbing member being used for the shock absorbing apparatus that is directed to the fourth example according to the present invention.

In the cylindrical portion 30 of the unitary shock-absorbing members 3, a pressure-receiving plate portion 32 is formed on a side that faces the front bumper 100; and a facing plate portion 33, which faces the pressure-receiving plate portion 32 parallelly while being separated from it by an interval, is formed on another side that faces the reinforcement 101; as illustrated in FIG. 12. A minor-diameter through hole 34, which communicates the hollow section with the outside, is formed in one of the walls that adjoins the lower side of the facing plate portion 33; and the through hole 34 is formed in a plurality of pieces in the longitudinal direction of the cylindrical portion 30 while being separated from each other by an interval.

Since the inclusion 2 is like a gel, it does not leak through the through holes 34 when being as it is; however, the through holes 34 are covered with a sealing material 35, which comprises a film being made from polyethylene, from the outer side in order to prevent the evaporation of water content from the inclusion 2.

The shock absorbing apparatus 200 according to the present example operates in the following manner to absorb shocks. When a shock acts on the front bumper 100 as indicated with the arrows in FIG. 10 and FIG. 12, the front bumper 100 deforms in such an approaching direction that it heads for the reinforcement 101, and the resulting stress is transmitted to the shock absorbing apparatus 200. That is, the force of impact is first transmitted to the unitary shock-absorbing members 3 from the pressure-receiving plate portion 32, and then the pressure-receiving plate portion 32 tries to deform in such a direction that it comes closer to the facing plate portion 33.

When a relatively smaller shock energy is applied to the pressure-receiving plate portion 32, the cylindrical portion 30 deforms so that the cross section is distorted, and accordingly the inclusion 2 moves being accompanied therewith; consequently, the impact is absorbed by means of this setting. Neither the sealing material 35 is torn apart nor the composition of the inclusion 2 is changed by forces with such an extent.

When a relatively stronger shock energy is applied to the pressure-receiving plate portion 32, the pressure-receiving plate portion 32 deforms in such a direction that it comes closer to the facing plate portion 33 so that the volume of the hollow section is decreased, and accordingly the inner pressure of the inclusion 2 is enhanced by means of compression. The resultant inner pressure is transmitted to the sealing member 35 through the through holes 34, and consequently the sealing member 35 ruptures when the inner pressure exceeds a predetermined value so that the through holes 34 open up. By means of this setting, the inclusion 2 flows out to the outside through the through holes 34, and thereby the pressure-receiving plate portion 32 approaches the facing plate portion 33 more. A large resistance force occurs when the inclusion 2 passes through the through holes 34, and the resulting resistance force sustains while the volume of the hollow section is decreasing. In other words, the shock energy is absorbed mainly by means of the resistance force that occurs when the inclusion 2 passes through the through holes 34, as well as by means of the deformations of the cylindrical portion 30 and inclusion 2.

Therefore, in accordance with the shock absorbing apparatus according to the present example, it is possible to absorb shock energies efficiently, because no spring back resulting from the inclusion 2 acts thereon, and because shock energies are absorbed mainly by means of resistance that arises when the inclusion 2 passes through the through holes 34.

And, no ribs exist in the hollow section, and accordingly no debris of ribs exist therein; it does not occur that the walls go into toward the inner side, and consequently the pressure-receiving plate portion 32 and facing plate portion 33 are eventually put into such a state they contact with each other as illustrated in FIG. 12. Therefore, the distance between the pressure-receiving plate portion 32 and the facing plate section 33 makes a shock-absorbing stroke, because shock energies are absorbed for a period of time until the pressure-receiving plate 32 comes in contact with the facing plate portion 33; thus, even when an interval between the front bumper 100 and the reinforcement 101 is short, it is possible to utilize all of that interval for absorbing shocks. To put it differently, ample shock absorbing performance can be demonstrated even in smaller disposition spaces.

Example No. 5

Figure 13:
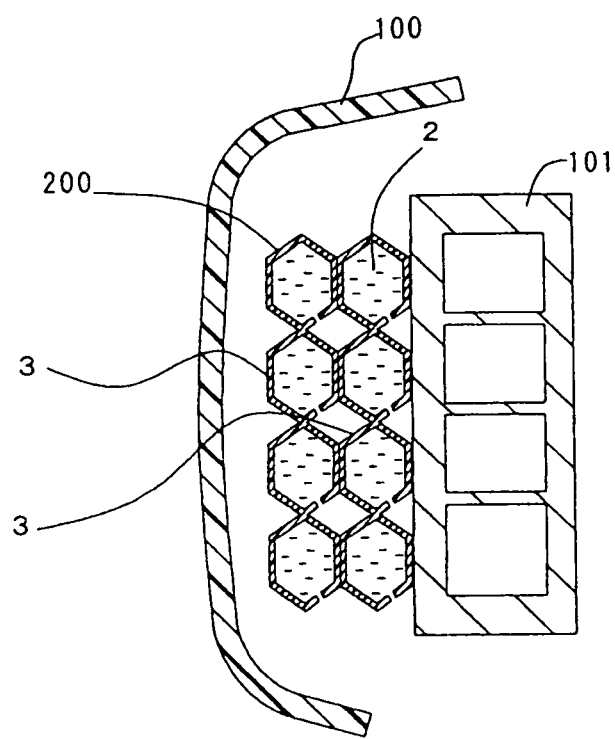
FIG. 13 is a cross-sectional diagram for illustrating the bumper section of automobile in which a shock absorbing apparatus that is directed to a fifth example according to the present invention is put in place.

Although the unitary shock-absorbing members 3 are connected so as to make one layer in Example No. 4, it is possible to make them into a multi-layered construction with two or more layers as illustrated in FIG. 13. Moreover, depending on the magnitude of shock energy, it is even possible to absorb the shock with one of the unitary shock-absorbing members 3 alone.

Example No. 6

Figure 14:
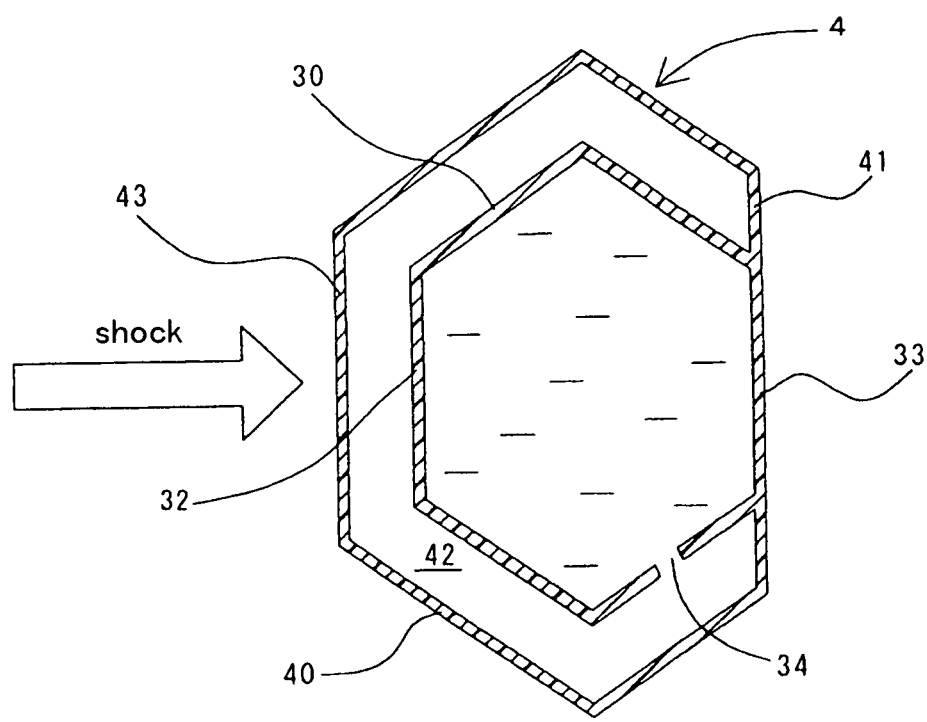
FIG. 14 is a cross-sectional diagram of a unitary shock-absorbing member being used for a shock absorbing apparatus that is directed to a sixth example according to the present invention.

A cross-sectional diagram of a unitary shock-absorbing member 4 that is directed to the present example is illustrated in FIG. 14. In this unitary shock-absorbing member 4, a cross-sectionally hexagon-shaped outer cylinder 40 is put in place integrally on the outer circumference of the cylindrical portion 30 in the unitary shock-absorbing members 3 according to Example No. 4. A facing wall 41 of the outer cylinder 40 not only doubles as the facing plate portion 33 of the cylindrical portion 30, but also makes a configuration that extends the facing plate portion 33 furthermore in the up/down direction; and the other five walls face the surfaces of the outer cylinder 40 while being separated from them by a predetermined distance respectively.

That is, a space 42 whose cross section is a substantially letter-"C" configuration is formed between the outer-circumferential surface of the cylindrical portion 30 and the inner-circumferential surface of the outer cylinder 40. Moreover, no through holes that connect the inside with the outside are formed in the outer cylinder 40.

This unitary shock-absorbing member 4 is put in place so as to make shocks act on a pressure-receiving wall 43 that faces the pressure-receiving plate portion 32 of the cylindrical portion 30. At the time of absorbing shocks, the pressure-receiving wall 43 presses the pressure-receiving plate portion 32 by means of the deformations of the outer cylinder 40, and accordingly the pressure-receiving plate portion 32 comes closer to the facing plate portion 33 in the same manner as Example No. 4. And, the inclusion 2 flows out through the through hole 34, and consequently shock energies are absorbed by means of the resulting resistances.

On this occasion, in accordance with the unitary shock-absorbing member 4 according to the present example, the inclusion 2, which has flowed out through the through hole 34, flows into the space 42, but it does not occur that it flows out from the space 42 to the outside. Therefore, the degree of freedom upgrades in selecting the material qualities for the inclusion 2.

Moreover, the cylindrical portion 30 deforms in the same manner as Example No. 4 so that not only the pressure-receiving plate portion 32 makes contact with the facing plate portion 33 and facing wall 41 but also the pressure-receiving wall 43 makes contact with the pressure-receiving plate portion 32. Therefore, even when an interval between the front bumper 100 and the reinforcement 101 is short, it is possible to utilize all of that interval for absorbing shocks, because the distance between the pressure-receiving wall 43 and the facing plate portion 33 makes a shock-absorbing stroke.

Example No. 7

Figure 15:
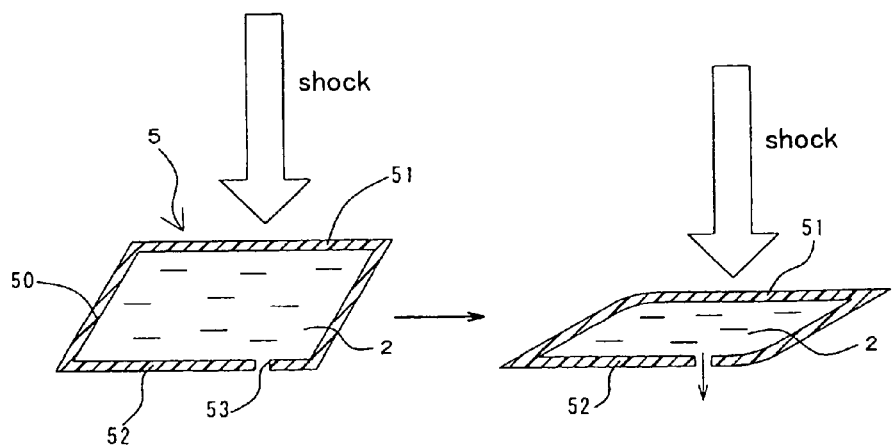
FIG. 15 is cross-sectional diagrams for illustrating deforming processes of a unitary shock-absorbing member being used for a shock absorbing apparatus that is directed to a seventh example according to the present invention.

As illustrated in FIG. 15, a unitary shock-absorbing member 5 that is directed to the present example possesses a cylindrical portion 50 whose cross section is a parallelogram; possesses a facing plate 52 on a side that faces a pressure-receiving plate 51 for receiving shocks; and a through hole 53 is formed in the facing plate 52. An inclusion 2 is filled inside the cylindrical portion 50 in the same manner as Example No. 4.

In the unitary shock-absorbing member 5 that is directed to the present example, the cylindrical portion 50 deforms so as to make the paired inclined side plates fall down forwards to each other in acute-angle directions; and then the pressure-receiving plate 51 and the facing plate 52 overlap each other eventually. Therefore, a distance between the pressure-receiving plate 51 and the facing plate 52 makes a shock-absorbing stroke.

Example No. 8

Figure 16:
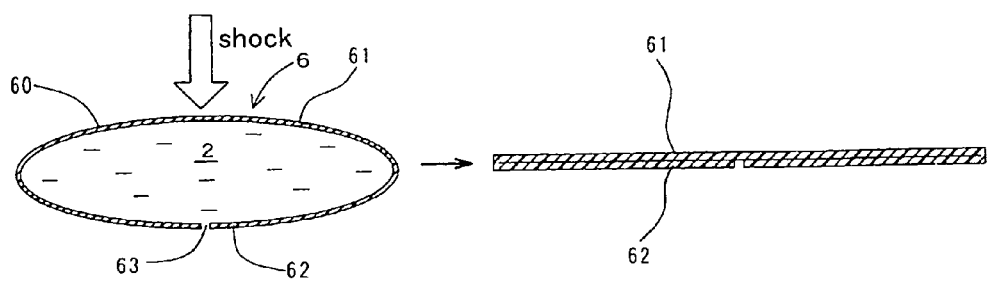
FIG. 16 is cross-sectional diagrams for illustrating deforming processes of a unitary shock-absorbing member being used for a shock absorbing apparatus that is directed to an eighth example according to the present invention.

As illustrated in FIG. 16, a unitary shock-absorbing member 6 that is directed to the present example possesses a cylindrical portion 60 whose cross section is an ellipse; one of the arc faces on the minor-axis side constitutes a pressure-receiving plate 61 for receiving shocks; and another one of the arc faces on the minor-axis side constitutes a facing plate 52. A through hole 63 is formed in the facing plate 52. An inclusion 2 is filled inside the cylindrical portion 60 in the same manner as Example No. 4.

In the unitary shock-absorbing member 6 that is directed to the present example, the cylindrical portion 60 deforms so that the minor axis of the cross-sectional oval becomes much shorter and the major axis becomes much longer; and then the pressure-receiving plate 61 and the facing plate 62 overlap each other eventually. Therefore, a distance between the pressure-receiving plate 61 and the facing plate 62 makes a shock-absorbing stroke.

Figure 17:
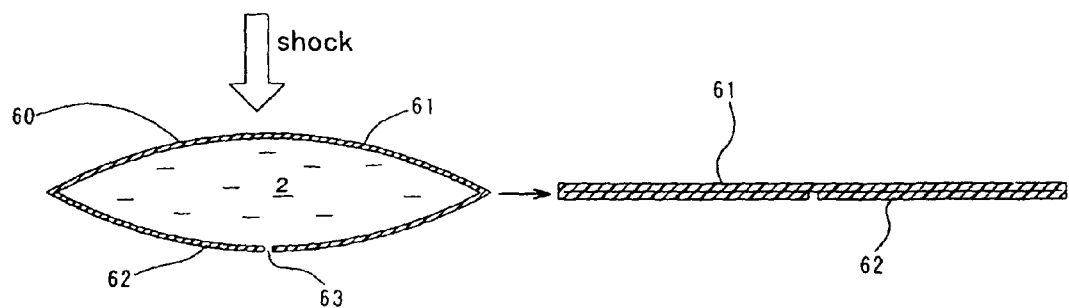
FIG. 17 illustrates another mode of the eighth example according to the present invention, and is cross-sectional diagrams for illustrating deforming processes of the unitary shock-absorbing member.
Figure 18:
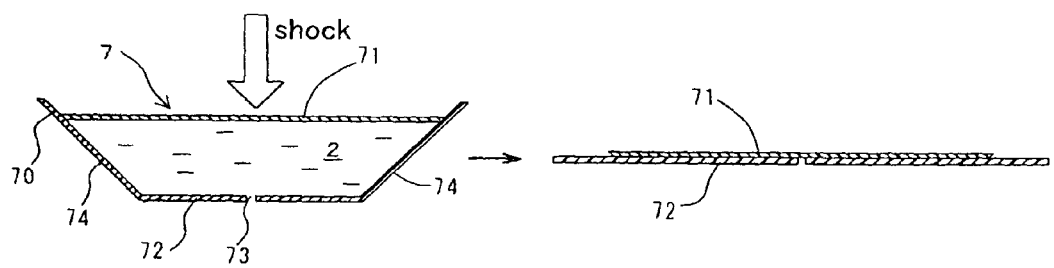
FIG. 18 is cross-sectional diagrams for illustrating deforming processes of a unitary shock-absorbing member being used for a shock absorbing apparatus that is directed to a ninth example according to the present invention.

Note that it is also allowable to make the cylindrical portion 60, not with the cross-sectional ellipse, but with a configuration in which a hollow section whose interval is the greatest at the central region by preparing one in which two strip-shaped flat plates are joined at the width-wise opposite ends and then deforming the one so as to make the resulting joined ends come closer to each other, as illustrated in FIG. 17. When making the cylindrical portion 60 thusly, it is possible to deform it with a small shock energy compared with that for deforming the cylindrical portion 60 whose cross section is an ellipse.

Example No. 9

As illustrated in FIG. 17, a unitary shock-absorbing member 7 that is directed to the present example possesses a cylindrical portion 70 that makes an inverted trapezoid in the cross section; the upper base constitutes a pressure-receiving plate 71 for receiving shocks; and the lower base constitutes on a facing plate 72. A through hole 73 is formed in the facing plate 72. An inclusion 2 is filled inside the cylindrical portion 70 in the same manner as Example No. 4.

In the present example, the pressure-receiving plate 71 presses a pair of side plates 74 to the outer sides, respectively, when the width-wise opposite ends of the pressure-receiving plate 71 come in contact with the inner sides of the paired side plates 74 and then the pressure-receiving plate 71 is moved in a direction approaching the facing plate 72 by mean of shocks; and then the pressure-receiving plate 71 and the facing plate 72 overlap each other eventually. Therefore, a distance between the pressure-receiving plate 71 and the facing plate 72 makes a shock-absorbing stroke.

Example No. 10

Figure 19:
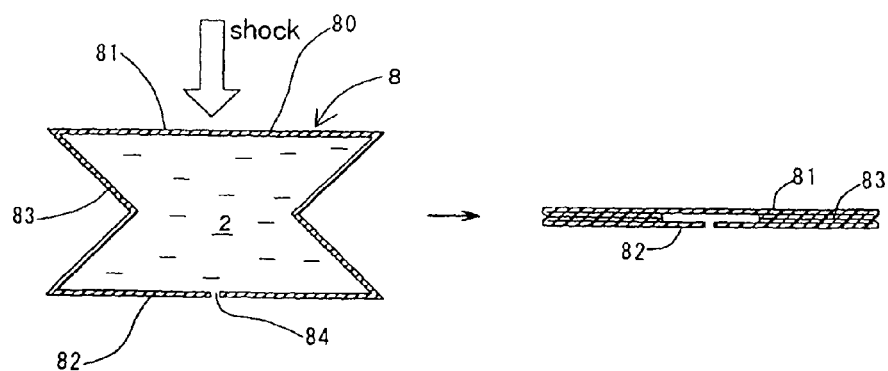
FIG. 19 is cross-sectional diagrams for illustrating deforming processes of a unitary shock-absorbing member being used for a shock absorbing apparatus that is directed to a tenth example according to the present invention.

As illustrated in FIG. 19, a unitary shock-absorbing member 8 that is directed to the present example possesses a cylindrical portion 80 that makes a "hand drum" shape in the cross section. The cylindrical portion 80 comprises an upper drum 81 and a lower drum 82 that are in parallel with each other, and a pair of throttles 83 that connect the upper drum 81 and the lower drum 82. The throttles 83 go into the hollow section at the central regions. The upper drum 81 constitutes a pressure-receiving plate portion for receiving shocks; and the lower drum 82 constitutes a facing plate portion. A through hole 84 is formed in the lower drum 82.

In the present example, the throttles 83 deform so as to make the central regions go into the hollow section more deeply when the upper drum 81 deforms in a direction approaching the lower drum 82 at the time of impact; and then the upper drum 81, two pieces of plates in the throttles 83, and the lower drum 82 overlap at the opposite ends eventually. Therefore, a value, which is found by deducting the thickness of the two plates in the throttles 83 from a distance between the upper drum 81 and the lower drum 82, makes a shock-absorbing stroke.

The invention claimed is:

1. A shock absorbing apparatus, comprising:
   a pressure-receiving plate portion to which shock is applied;
   a facing plate portion facing the pressure-receiving plate portion and being separated therefrom by an interval; and
   checkered ribs connecting the pressure-receiving plate portion with the facing plate portion and forming and demarcating a plurality of minor compartments between the pressure-receiving plate portion and the facing plate portion;
   the plurality of minor compartments comprising:
      filled minor compartments holding and containing a gelatinous filling consisting of a gelatinous body containing a liquid as a major component;
      vacant minor compartments containing air; and
      at least a first one of the vacant minor compartments adjoining a first one of the filled minor compartments;
      a second one of the vacant minor compartments adjoining the first one of the vacant minor compartments;
      a fragile section being formed in at least one rib of the ribs, the one rib demarcating the first one of the filled minor compartments and the at least first one of the vacant minor compartments; and
      another fragile section formed in another one rib of the ribs, the another one rib demarcating the first one of the vacant minor compartments and the adjoining second one of the vacant minor compartments,
   wherein the ribs buckle to absorb shock energy and the gelatinous filing is compressed to further absorb the shock energy when shock is applied in such a direction that brings the pressure-receiving plate portion and the facing plate portion closer to each other; and
   the shock energy is furthermore absorbed by circulation resistance to the gelatinous filling that flows from the first one of the filled minor compartments to the at least first one of the vacant minor compartments after the fragile section has fractured.

2. The shock absorbing apparatus according to claim 1, wherein only a plurality of the vacant minor compartments adjoin the filled minor compartments.

3. The shock absorbing apparatus according to claim 1, wherein the filled minor compartments and the vacant minor compartments have a cylindrical shape whose cross section is a regular hexagon.

4. The shock absorbing apparatus according to claim 1, wherein the fragile section is a thin-walled section.

5. The shock absorbing apparatus according to claim 1, wherein the fragile section is formed in the vicinity of one of the pressure-receiving plate portion and the facing plate portion.

6. The shock absorbing apparatus according to claim 1, wherein the pressure-receiving plate portion is arranged parallel to the facing plate portion.

7. The shock absorbing apparatus according to claim 1, further comprising at least two rows of the plurality of minor compartments arranged as follows:
   a first row having an alternating arrangement of one of the vacant minor compartments and one of the filled minor compartments, and
   a second row of only the vacant minor compartments.

8. A shock absorbing apparatus, comprising:
   a pressure-receiving plate portion arranged for receiving a shock;
   a facing plate portion facing the pressure-receiving plate portion and being separated therefrom by ribs extending between and connecting the pressure-receiving plate portion and the facing plate portion; the ribs including ribs extending between and connecting ends of the pressure-receiving plate portion and the facing plate portion, the pressure-receiving plate portion and the facing plate portion being integrally formed and demarcating a plurality of hollow compartments between the pressure-receiving plate portion and the facing plate portion,
   wherein:
   the hollow compartments include liquid-containing compartments and air-containing compartments,
   the hollow compartments are arranged with one of the gas-containing compartments adjoining one of the liquid-containing compartments that share a common rib of the ribs extending between and connecting the pressure-receiving plate portion and the facing plate portion, and the common rib has a fragile section;
   two of the gas-containing compartments adjoining each other; and
   another common rib arranged between the two adjoined gas-containing compartment having another fragile section that ruptures to further absorb the shock energy, and
   when a shock is applied to the pressure-receiving plate that brings the pressure-receiving plate portion and the facing plate portion closer to each other,
      the ribs buckle and firstly absorbs shock energy from the shock,
      liquid contained in the liquid-containing compartments is compressed and secondly absorbs the shock energy,
      the compressed liquid resulting from the shock thirdly absorbs the shock energy by rupturing the fragile section of the common rib and forming an opening between the one of the gas-containing compartments adjoining the one of the liquid-containing compartments having the common rib therebetween, and
      the compressed liquid resulting from the shock flows from the one of the liquid-containing compartments through the opening formed by the ruptured fragile section of the common rib into the adjoining one of the gas-containing compartments and circulation resistance of the liquid flow through the opening fourthly absorbs the shock energy.

9. The shock absorbing apparatus according to claim 8, wherein the pressure-receiving plate portion is arranged parallel to the facing plate portion.

10. The shock absorbing apparatus according to claim 8, wherein a plurality of the gas-filled compartments adjoin a single liquid-filled compartment of the liquid-filled compartments.

11. The shock absorbing apparatus according to claim 8, wherein each of the hollow compartments has a cylindrical shape and a regular hexagonal cross-section.

12. The shock absorbing apparatus according to claim 8, wherein the fragile section is a walled section having a reduced thickness.

13. The shock absorbing apparatus according to claim 8, wherein the fragile section is arranged adjacent one of the pressure-receiving plate portion and the facing plate portion.

14. The shock absorbing apparatus according to claim 8, further comprising at least two rows of the hollow compartments arranged as follows:
   a first row having an alternating arrangement of one of the gas-containing compartments and one of the liquid-containing compartments, and
   a second row of only the gas-containing compartments.

* * * * *